(12) United States Patent
Zhong

(10) Patent No.: US 8,417,066 B2
(45) Date of Patent: Apr. 9, 2013

(54) METHOD AND SYSTEM FOR POLYPHASE FILTERING BY COMBINING IIR AND FIR FILTERS AND ITS APPLICATIONS IN VIDEO SCALING

(75) Inventor: Sheng Zhong, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 2972 days.

(21) Appl. No.: 10/980,200

(22) Filed: Nov. 3, 2004

(65) Prior Publication Data
US 2005/0196072 A1    Sep. 8, 2005

Related U.S. Application Data

(60) Provisional application No. 60/550,242, filed on Mar. 4, 2004.

(51) Int. Cl.
*G06K 9/32*    (2006.01)
(52) U.S. Cl. ...................................................... 382/300
(58) Field of Classification Search .......... 382/298–300; 348/561, 581, 582, 704, 441–559; 345/660–671
See application file for complete search history.

(56) References Cited

U.S. PATENT DOCUMENTS

| | | | | |
|---|---|---|---|---|
| 5,268,751 A | * | 12/1993 | Geiger et al. | 348/446 |
| 5,274,372 A | * | 12/1993 | Luthra et al. | 341/61 |
| 6,275,619 B1 | * | 8/2001 | Chui | 382/248 |
| 6,317,765 B1 | * | 11/2001 | Page et al. | 708/313 |
| 6,600,495 B1 | * | 7/2003 | Boland et al. | 345/660 |
| 7,119,845 B2 | * | 10/2006 | Lafon | 348/441 |
| 7,280,878 B1 | * | 10/2007 | Rossum | 700/94 |
| 7,391,933 B2 | * | 6/2008 | Wang et al. | 382/300 |
| 2001/0036323 A1 | * | 11/2001 | Chui | 382/276 |

* cited by examiner

*Primary Examiner* — Chan S Park
*Assistant Examiner* — Sean Motsinger
(74) *Attorney, Agent, or Firm* — Thomas | Horstemeyer, LLP

(57) ABSTRACT

Methods and systems for achieving high sub-pixel precision while processing a video signal are provided. Aspects of the method may include selecting IIR filter coefficients for implementing an IIR filter for filtering a video signal during scaling. Polyphase filter coefficients may be selected for implementing a polyphase filter for filtering the video signal during the scaling. The video signal may be filtered using a combination of the IIR filter having the selected IIR filter coefficients and the polyphase filter having the selected polyphase filter coefficients. The polyphase filter coefficients may implement a finite impulse response (FIR) filter for filtering the video signal. The video signal may be phase-shifted. The scaling of the video signal may comprise upscaling or downscaling the video signal. The video signal may be converted from a first format to a second format by combined IIR-filtering and polyphase filtering.

30 Claims, 6 Drawing Sheets

METHOD AND SYSTEM FOR POLYPHASE FILTERING BY COMBINING IIR AND FIR FILTERS AND ITS APPLICATIONS IN VIDEO SCALING

CROSS-REFERENCE TO RELATED APPLICATIONS/INCORPORATION BY REFERENCE

This application makes reference to, claims priority to, and claims the benefit of U.S. Provisional Application Ser. No. 60/550,242, filed Mar. 4, 2004 and entitled "Polyphase Filtering By Combining IIR And FIR Filters And Its Applications In Video Scaling."

The above stated application is hereby incorporated herein by reference in its entirety.

FIELD OF THE INVENTION

Certain embodiments of the invention relate to processing of video signals. More specifically, certain embodiments of the invention relate to a method and system for polyphase filtering by combining IIR and FIR filters and its applications in video scaling.

BACKGROUND OF THE INVENTION

In the field of video and image processing, it may be necessary to apply horizontal and/or vertical scaling to images. For example, certain format conversion required by standards, such as ATSC (Advanced Television Systems Committee) and certain applications such as video zooming in, zooming out, and picture-in-picture (PIP) functions, require vertical and/or horizontal scaling.

FIG. 1 illustrates a conventional image scaling system. The conventional image scaling system 100 may comprise an upsampler 101, a lowpass filter (LPF) 103, and a downsampler 105. The upsampler 101 has an upsampling factor of I, and the downsampler 105 has a downsampling factor of D. The source/destination scale factor, therefore, is D/I.

During operation of the conventional image scaling system 100, an incoming video signal x(n) may be upsampled by the upsampler 101 utilizing an upsampling factor of I. The initial sampling rate of the video signal x(n) may be F, which may indicate the number of received pixel samples per second. During upsampling of the video signal x(n), an (I−1) number of zeros may be inserted between each two received pixel samples. Upsampling may result in passband copies of $X(\omega)$, which is the Fourier Transform of x(n) in the frequency domain, at every multiple of $$\frac{2\pi}{I}.$$

Low Pass Filtering (LPF) should be applied to reject the frequency components beyond $$\frac{2\pi}{I}$$

and thus would compress the bandwidth of the signal by a factor of I. Downsampling expands the spectrum of the signal by a factor of D. The downsampling factor D may indicate that one pixel sample is retained for every D pixel samples. If the downsampling factor D is greater than the upsampling factor I, aliasing may occur when copies of $X(\omega D/I)$ overlap, so additional LPF 103 may be used after the upsampler 101 to isolate the baseband copy of $X(\omega D/I)$.

The LPF 103 may comprise a finite impulse response (FIR) filter, which has the advantage of having linear phase and being easy to implement. For example, a certain system may employ an 8-phase-by-8-tap FIR filter and a 4-phase-by-4-tap FIR filter to achieve the horizontal and vertical scaling, respectively. While such architecture accomplishes satisfactory results for some video format conversions, aliasing may be present during the video scaling process and may become very severe and objectionable for large scale factors for downscaling such as those larger than 3:1 vertically and 6:1 horizontally, which may be due to limited number of taps utilized in the FIR filter.

One solution to such a problem would be to increase the number of taps. However, increasing the number of taps in the FIR filter may become costly and may not contribute substantially to resolving the aliasing problem. For example, if the number of taps in the vertical FIR filter is doubled to 8-taps, the cost increases, but the filter may not achieve 10:1 downscaling well. As a result, the cost is substantially increased in return for slight improvement in performance.

FIR filtering may require very high order and long tap-length filters when very low cutoff frequency is needed, which may result in a significantly high cost for hardware implementation. Due to cost restrictions, most systems may not afford to increase the size of the filter arbitrarily to achieve a desirable downscaling factor. In the above example, with the 8-phase-by-8-tap FIR horizontal filter and a 4-phase-by-4-tap FIR vertical filter, aliasing starts to manifest and may become very objectionable when the scale factor for downscaling is larger than 3:1 vertically and 6:1 horizontally, for example.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain aspects of the invention may be found in a method and system for achieving high sub-pixel precision while processing a video signal. Aspects of the method may include implementing an IIR filter for filtering a video signal during scaling utilizing IIR coefficients, and implementing a polyphase filter (PPF) for filtering the video signal during the scaling utilizing PPF coefficients. The IIR and/or FIR filter coefficients may be generated by certain method(s) and may be stored in the system. The video signal may be filtered using a combination of the IIR filter having the specified IIR filter coefficients and the polyphase filter having the specified polyphase filter coefficients. The polyphase filter coefficients may implement a finite impulse response (FIR) filter for filtering the video signal. The video signal may be phase-shifted. A phase for the video signal may be determined prior to filtering the video signal.

The scaling of the video signal may comprise upscaling or downscaling the video signal. The video signal may be converted from a first format to a second format by combined IIR-filtering and polyphase filtering the video signal utilizing the IIR and polyphase filter coefficients. A scaling factor for scaling the video signal may be determined. The scaling factor may be utilized to determine the extent of low pass filtering. A phase value of the video signal may be determined utilizing the scaling factor and the input and output video formats. The video signal may be low pass filtered according to the specified IIR and polyphase filter coefficients.

Another aspect of the invention may provide a machine-readable storage, having stored thereon, a computer program having at least one code section executable by a machine, thereby causing the machine to perform the steps as described above for achieving high sub-pixel precision while processing a video signal.

The system for achieving high sub-pixel precision while processing a video signal may include a scaling engine that selects the IIR filter coefficients for implementing an IIR filter for filtering a video signal during scaling. The scaling engine may select the polyphase filter coefficients for implementing a polyphase filter for filtering the video signal during the scaling. The scaling engine may filter the video signal using a combination of the IIR filter having the selected IIR filter coefficients and the polyphase filter having the selected polyphase filter coefficients. The polyphase filter coefficients may implement a finite impulse response (FIR) filter for filtering the video signal. The scaling engine may phase-shift the video signal and/or buffer the video signal, if desired. The scaling engine may determine a phase for the video signal prior to filtering the video signal.

The scaling engine may be adapted to upscale or downscale the video signal during scaling and may convert the video signal from a first format to a second format by combined IIR-filtering and polyphase filtering the video signal utilizing the IIR and polyphase filter coefficients. The scaling engine may determine a scaling factor for scaling the video signal and may also determine an extent of the low pass filtering utilizing the scaling factor and/or a phase value of the video signal utilizing the scaling factor. The scaling engine may low pass filter the video signal according to the generated IIR and polyphase filter coefficients.

These and other advantages, aspects and novel features of the present invention, as well as details of an illustrated embodiment thereof, will be more fully understood from the following description and drawings.

DETAILED DESCRIPTION OF THE INVENTION

Aspects of the invention relate to methods and systems for achieving efficient large scale-factor scaling. More specifically, aspects of the present invention relate to utilizing a combination of infinite impulse response (IIR) filters and finite impulse response (FIR) filters to provide large scale-factor downscaling. IIR filter coefficients for implementing an IIR filter and polyphase filter coefficients for implementing a polyphase filter may be selected for filtering a video signal before scaling. The video signal may be filtered using a combination of the IIR filter having the IIR filter coefficients and the polyphase filter having the polyphase filter coefficients. A combined filter structure provides unification of the coefficients of the IIR and FIR filters into a single set, which improves software management of the coefficients for scaling-factor changes. In addition, combining the filters may reduce the complexity of hardware implementation compared to other structures such as, for example, cascaded lower order sections or lattice structure. Also, combining an IIR filter and an FIR filter provides the flexibility of using a single degenerated polyphase FIR filter.

Figure 1:
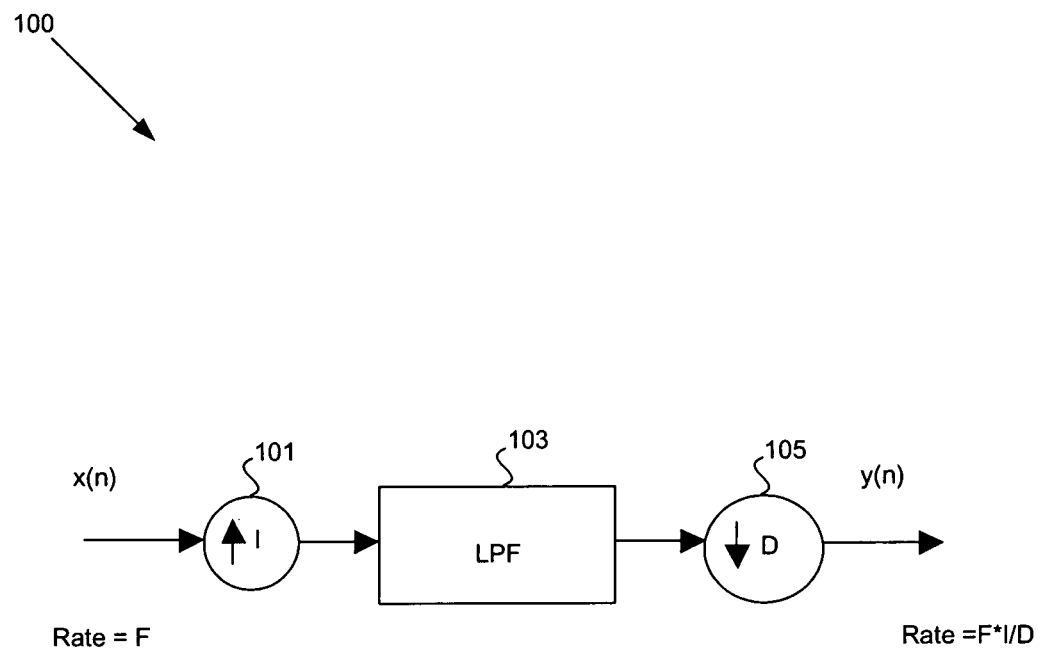
FIG. 1 illustrates a conventional image scaling system.
Figure 2:
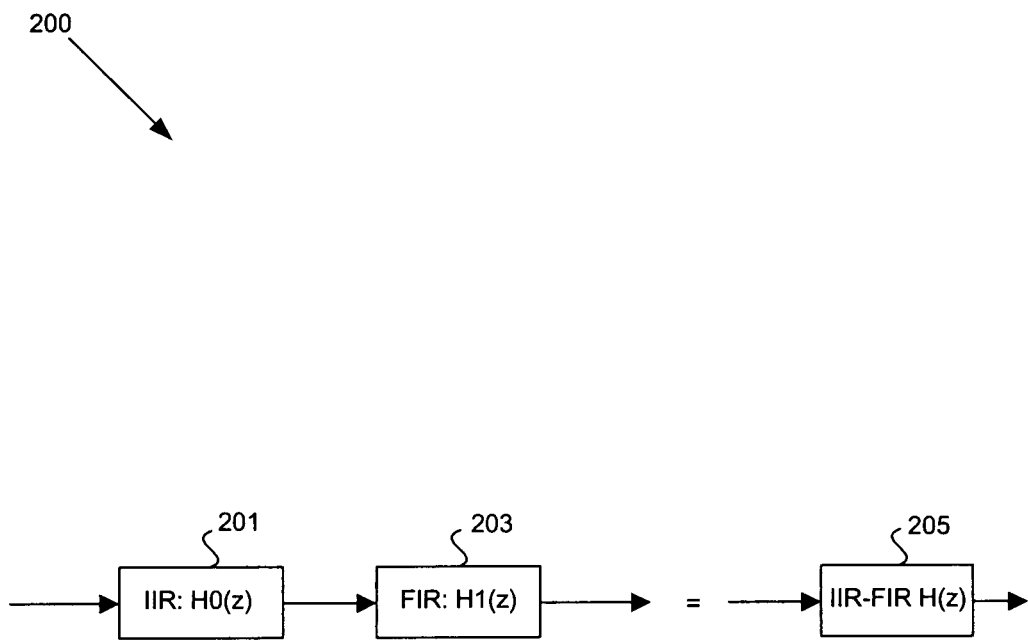
FIG. 2 illustrates an exemplary scaling system utilizing a cascade of IIR and FIR filters, in accordance with an embodiment of the invention.

FIG. 2 illustrates an exemplary scaling system utilizing a cascade of IIR and FIR filters, in accordance with an embodiment of the invention. The exemplary scaling system 200 may comprise an IIR filter 201 and a FIR filter 203. The IIR filter 201 and the FIR filter 203 may be combined together to form an IIR-FIR filter combination 205.

The response in the z-transform domain of the IIR filter 201 may be $H_0(z)$ and the response in the z-transform domain of the FIR filter may be $H_1(z)$. IIR filters are different from FIR filters in that they calculate a present state based on a past state of the system, so they are designed with feedback, and may be expressed with a rational function. For example if an input to an IIR filter is a signal x(n) and the output is a signal y(n), an intermediate function v(n) may have to be computed in order to compute y(n), and v(n) is a function of past values of v(n) such as, for example, v(n−1), v(n−2), etc. Thus the z-transform responses of the IIR filter 201 and the FIR filter 203 may be represented by the following equations:

$$H_0(z) = \frac{B(z)}{A(z)} \text{ and}$$

$$H_1(z) = C(z),$$

where A(z), B(z) and C(z) are all polynomials of 1/z and may be expressed as $$A(z) = 1 + \sum_{i=1}^{N} a_i z^{-i};$$

$$B(z) = \sum_{i=0}^{M} b_i z^{-i} \text{ and}$$

$$C(z) = \sum_{i=0}^{L} c_i z^{-i}.$$

When the IIR filter 201 and the FIR filter 203 are cascaded, the overall system function may be represented by the IIR-FIR filter block 205 with a z-transform response H(z). The z-transform response H(z) of the IIR-FIR filter combination 205 may be represented by the equations:

$$H(z) = H_1(z)H_0(z) = \frac{D(z)}{A(z)} \text{ where}$$

$$D(z) = C(z)B(z) = \sum_{i=0}^{L+M} d_i z^{-i} \text{ and}$$

-continued $$d_i = \sum_{k=0}^{i} c_k b_{i-k}.$$

In the above equations, $c_k=0$ if k>L, and $b_k=0$ if k>M.

Figure 3:
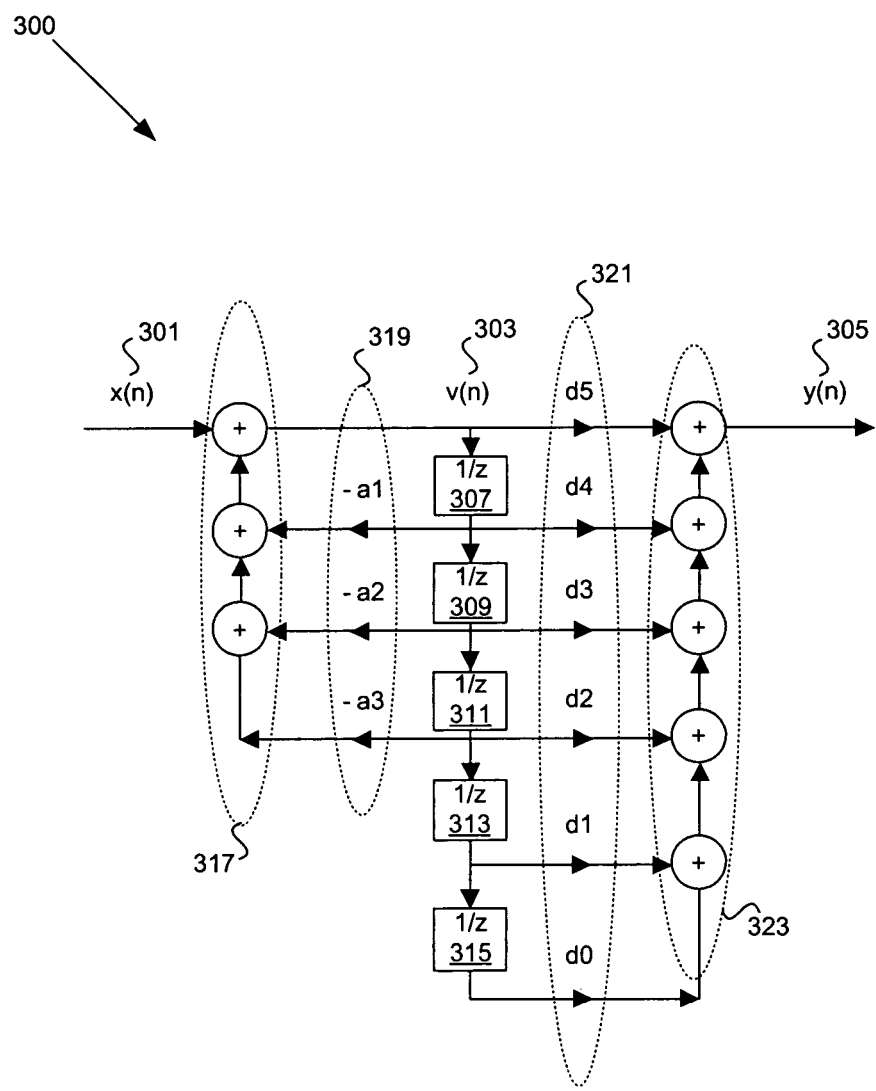
FIG. 3 illustrates an exemplary direct form II structure for implementing the overall scaling system of FIG. 2, in accordance with an embodiment of the invention.

FIG. 3 illustrates an exemplary direct form II structure for implementing the overall scaling system of FIG. 2, in accordance with an embodiment of the invention. The exemplary direct form II structure 300 may comprise a plurality of adders 317 and 323, and buffers 307, 309, 311, 313, and 315. The direct form II structure 300 may be adapted to filter an incoming signal x(n) 301 and output a resulting processed signal y(n) 305. In the exemplary direct form II implementation 300 of FIG. 3, L=2 and M=N=3 in the above equations, effectively resulting in combining a $3^{rd}$-order IIR filter and a $2^{nd}$-order FIR filter. Since the direct form II implementation 300 effectively represents an IIR-FIR filter combination, an intermediate function v(n) 303 may be utilized so that the output function y(n) 305 may be calculated. In one aspect of the invention, the exemplary system 300 may be designed and implemented as software running on a processor. In another aspect of the invention, the exemplary system 300 may be designed and implemented as a special hardware. Either method may support up to 20:1 downscaling with reasonably good picture quality in a video system.

In operation, each of the buffers 307, 309, 311, 313, and 315 may be adapted to provide a delay of one sampling period to the incoming signal x(n) 301 so that the intermediate function v(n) 303 may be calculated. For each of the buffers 307, 309, 311, 313, and 315, a value of 1/z, or $z^{-1}$, may be used to denote a delay of one sampling period, or in the case of scaling in the vertical direction, a delay of one line period. Such functionality of the line buffers 307, 309, 311, 313, and 315 may be accomplished by each line buffer storing a single pixel value. In this way, the intermediate function v(n) 303 after the first sampling delay 1/z may represents v(n−1). In this way, the form II structure 300 representing an IIR-FIR filter combination, may be described by the following difference equations:

$$v(n) = x(n) - a_1 v(n-1) - a_2 v(n-2) - a_3 v(n-3)$$
$$= x(n) - \sum_{k=1}^{M} a_k v(n-k), \text{ and}$$
$$y(n) = \sum_{k=0}^{M+L} d_k v(n+k-M-L).$$

The intermediate function v(n) 303 is dependant on the signal input x(n) 301 and a previous intermediate function output v(n−k). In operation, each intermediate function v(n) 303 may be obtained by multiplying the outputs of each of the buffers 307, 309, and 311 by the corresponding filtering coefficients 319, (−a1), (−a2) and (−a3), respectively. Since M=N=3 and L=2, only three filtering coefficients 319 may be utilized in this aspect of the invention. However, the invention is not limited in this manner and IIR-FIR filter combinations may be utilized for scaling implementations with M, N and L values being different. By utilizing the plurality of adders 317, v(n) may be calculated according to the above equation.

The output scaled signal y(n) 305 in the form II structure 300 may be calculated as a function of a d-coefficient and an intermediate function v(n), according to the above equation. In operation, outputs of each of the buffers 307, 309, 311, 313 and 315 may be multiplied by the corresponding filtering coefficients 321, d5 through d0 respectively, to obtain the scaled signal y(n) 305.

Figure 4:
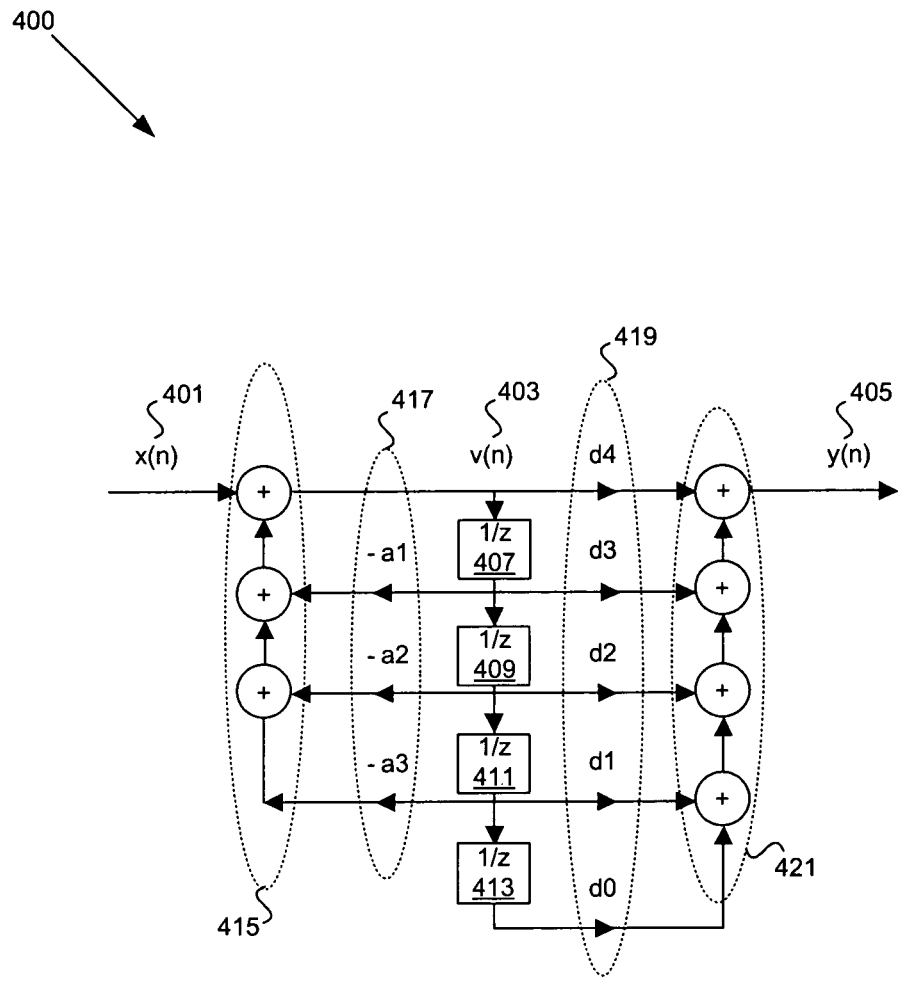
FIG. 4 illustrates another exemplary direct form II structure for implementing the overall scaling system of FIG. 2, in accordance with an embodiment of the invention.

FIG. 4 illustrates another exemplary direct form II structure for implementing the overall scaling system of FIG. 2, in accordance with an embodiment of the invention. The exemplary direct form II structure 400 may comprise plurality of adders 415 and 421, and buffers 407, 409, 411, and 413. The direct form II structure 400 may be adapted to filter an incoming signal x(n) 401 and output a resulting processed signal y(n) 405. In the exemplary direct form II implementation 400 of FIG. 4, L=1 and M=N=3. For a more cost-effective implementation, the FIR filter may be $1^{st}$-order, in which L=1 and therefore the combined system 400 may only require a total of 4 buffers to realize. In one aspect of the invention, it may be sufficient to do large-scale downsampling as the FIR filter may be mainly used to support phase shifting and IIR filter may be used to achieve the desired lowpass filtering.

Since the direct form II implementation 400 effectively represents an IIR-FIR filter combination, an intermediate function v(n) 403 may be utilized so that the output function y(n) 405 may be calculated. The exemplary system 400 may be designed and implemented as software running on a processor or special hardware and may support up to 20:1 downscaling with reasonably good picture quality in a video system.

In operation, each of the buffers 407, 409, 411 and 413 may be adapted to provide a delay of one sampling period, or in the case of scaling in the vertical direction, a delay of one line period, to the incoming signal. x(n) 401 so that the intermediate function v(n) 403 may be calculated. For each of the buffers 407, 409, 411 and 413, a value of 1/z, or $z^{-1}$, may be used to denote a delay of one sampling period, or in the case of scaling in the vertical direction, a delay of one line period. Such functionality of the buffers 407, 409, 411 and 413 may be accomplished by each buffer storing a single pixel value. In this way, the intermediate function v(n) 403 after the first sampling delay 1/z represents v(n−1). In this way, the form II structure 400 representing an IIR-FIR filter combination, similarly to the form II structure 300 of FIG. 3, may be described by the following difference equations:

$$v(n) = x(n) - a_1 v(n-1) - a_2 v(n-2) - a_3 v(n-3)$$
$$= x(n) - \sum_{k=1}^{M} a_k v(n-k), \text{ and}$$
$$y(n) = \sum_{k=0}^{M+L} d_k v(n+k-M-L).$$

The intermediate function v(n) 403 is dependent on the signal input x(n) 401 and a previous intermediate function output v(n−k). In operation, each intermediate function v(n) 403 may be obtained by multiplying the outputs of each of the buffers 407, 409 and 411 by the corresponding filtering coefficients 417, (−a1), (−a2) and (−a3), respectively. Since M=N=3 and L=1, only three filtering coefficients 417 may be utilized in this aspect of the invention. By utilizing the plurality of adders 415, v(n) may be calculated according to the above equation.

The output scaled signal y(n) 405 in the form II structure 400 may be calculated as a function of d-coefficient and intermediate function v(n), according to the above equation. In operation, outputs of each of the buffers 407, 409, 411 and 413 may be multiplied by the corresponding filtering coefficients 421, d4 through d0 respectively to obtain the scaled signal y(n) 405.

In one aspect of the invention, a vertical scaler may utilize an IIR-FIR filter combination and may serve as a general-purpose scaling engine for video scaling with increased sub-pixel precision. As a result multi-phase filtering may be needed. In the combined IIR and FIR scheme described hereinabove, the IIR filter plays the role of smoothing the signal and the FIR filter may be used to play the role of differentiating the phases, or a phase-shifter. Corresponding to the exemplary structure 300 in FIG. 3, or 400 in FIG. 4, a multi-phase-3-tap, or multi-phase-2-tap filter may be used to accomplish phase shifting. For example, if the scaling factor is rationally expressed as I/D for the ratio of destination/source and D and I are co-prime, then an I-phase-3-tap filter (or I-phase-2-tap filter) may be designed. In this way, a $3^{rd}$-order IIR filter that satisfies the frequency response requirement of the scaling problem at hand may also be designed.

For a pixel n in each row of the output scaled picture denoted as $X_o(n)$, for any of the IIR-FIR filter combination systems 300 or 400 in FIG. 3 or FIG. 4 respectively, the phase may be selected as p=D*n (mod I). Then, the 3-tap, or 2-tap, sub-filter of phase p may be used to generate the coefficients $d_0(p), d_1(p), \ldots, d_5(p)$ (or $d_0(p), d_1(p), \ldots, d_4(p)$) as described by the equations for $d_i$ hereinabove. This sub-filter of phase p may be also denoted as $\{d(p,i), i=0, 1 \ldots 4, \text{and/or } 5\}$. The derivation process of $\{d(p,i), i=0, 1 \ldots 4, \text{and/or } 5\}$ may be achieved off line. In another aspect of the invention, for the phases from 0 to I−1, the d-coefficients may form an I-phase-6-tap (or 5-tap) filter.

In a different aspect of the invention, while being used for downsampling/upsampling, an IIR-FIR filter combination may also handle format conversions such as, for example, from ASTC 1280×720P (progressive) at 60 frames per second (fps) to 720×480I (interlaced) at 30 fps, or from 720×480I at 30 fps to 1920×1080I at 30 fps. The initial phases and offsets for filtering for the top and bottom fields may be set up to correspond and adapt to different format conversions and size changes. Such initial phases and offsets may be made programmable, given that there are many types of conversions and each conversion may require its corresponding selection scheme.

An initial phase and an offset value used in a scaling process may be calculated. The initial phase may be any value between, for example, 0 and I−1. In a hardware scaling engine, this may be a register that can be programmed to the value of the corresponding initial phase. An offset value may be used to select the initial filtering center pixel. It may also be implemented as a register in a hardware scaling engine. The value for the register may be programmed as the corresponding offset value. In an embodiment of the present invention, the 4-bit width of the initial phase and the offset registers may allow, for example, performing progressive-to-interlaced conversion with a downscaling factor up to 30:1.

In accordance with an aspect of the invention, combined IIR-FIR filter may be utilized as a polyphase, or FIR, filter. In order to accomplish such functionality, the coefficients $a_1$, $a_2$ and $a_3$ in FIGS. 3 and 4 for example, may be set to be zero, which may effectively configure the combined polyphase IIR-FIR filter as an I-phase-6-tap, or I-phase-5-tap, polyphase (FIR) filter. For some format conversion cases, for example, the 1080I to 480I conversion such as HD to SD conversion, a degenerated FIR filter may provide good results. A combined polyphase IIR-FIR filter may be utilized as a FIR filter for scale-up functionality without the necessity of a low pass filter, and when phase shifting may be necessary.

Figure 5:
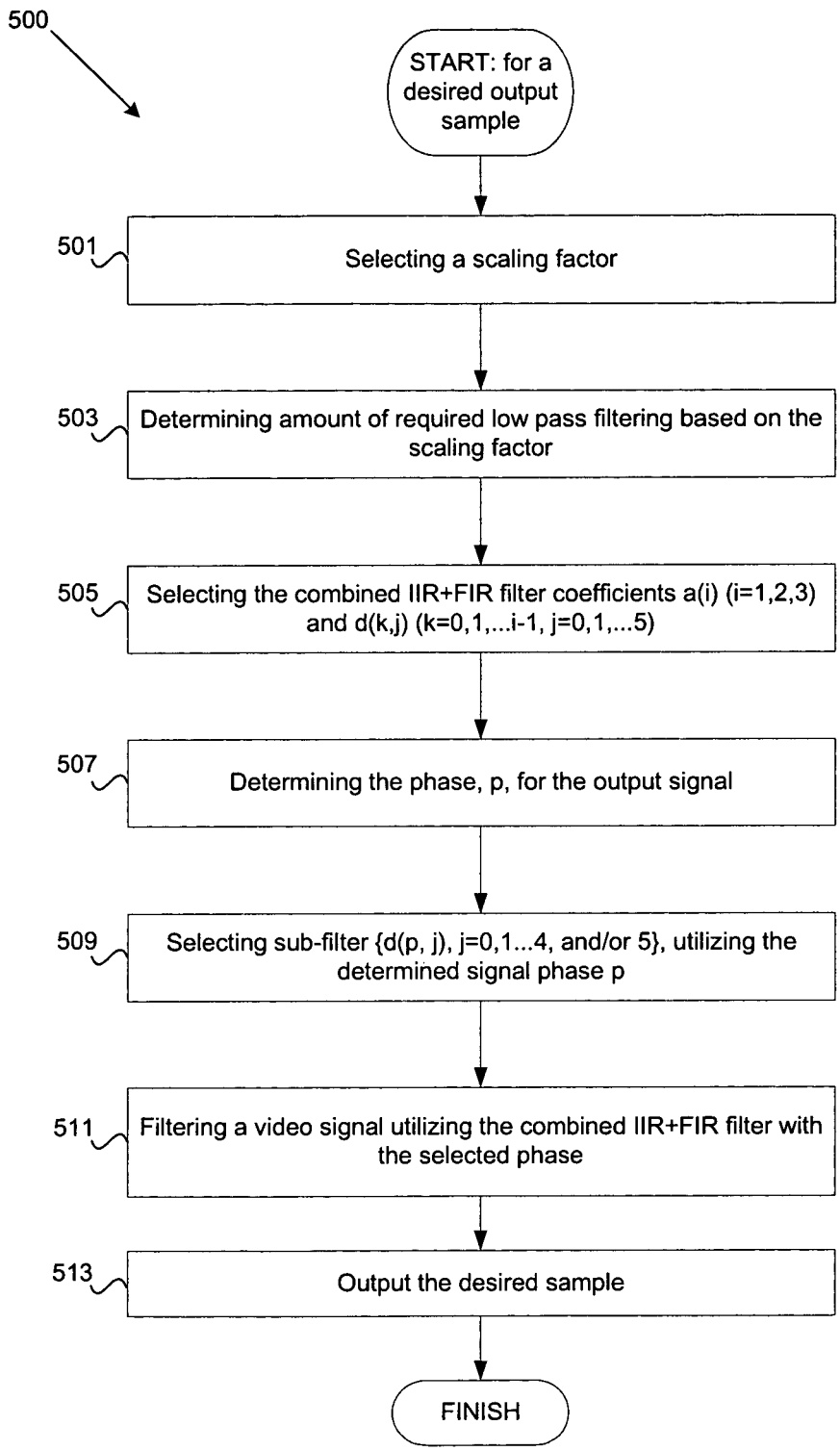
FIG. 5 is a flow diagram of an exemplary method for achieving high sub-pixel precision while processing a video signal, in accordance with an embodiment of the invention.

FIG. 5 is a flow diagram of an exemplary method 500 for achieving high sub-pixel precision while processing a video signal, in accordance with an embodiment of the invention. At 501, a scaling factor may be selected by, for example, selecting an upsampling and a downsampling factor. At 503, the amount of required low pass filtering may be determined based on the scaling factor. At 505, the combined IIR and FIR filter coefficients a(i) (i=1, 2, 3) and d(k,j) (k=0, 1, \ldots i−1, j=0, 1, \ldots 5) may be selected. At 507, an output signal phase, p, for the output signal may be determined. At 509, a sub-filter $\{d(p, j), j=0, 1 \ldots 4, \text{and/or } 5\}$ may be selected utilizing the determined signal phase p. At 511, a video signal may be filtered utilizing the combined IIR and FIR filter with the selected signal phase. At 513, the desired sample may be outputted.

Figure 6:
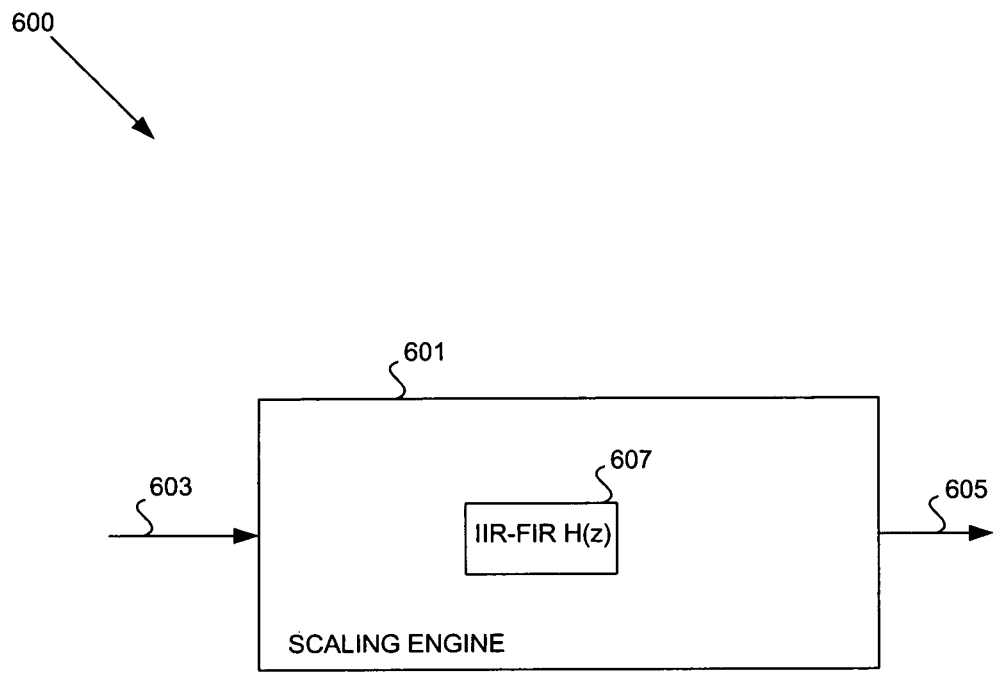
FIG. 6 is a block diagram of an exemplary system that may be used in connection with achieving high sub-pixel precision while processing a video signal, in accordance with an embodiment of the invention.

FIG. 6 is a block diagram of an exemplary system 600 that may be used in connection with achieving high sub-pixel precision while processing a video signal, in accordance with an embodiment of the invention. The exemplary system 600 may comprise a scaling engine 601. The scaling engine 601 may be adapted to receive an incoming signal 603 and generate a scaled output signal 605. The scaling engine 601 may comprise an IIR-FIR filter combination 607.

The scaling engine 601 may select IIR filter coefficients for implementing an IIR filter for filtering the incoming video signal 603 during scaling. The scaling engine 601 may select polyphase filter coefficients for implementing a polyphase filter for filtering the video signal 603 during the scaling. The scaling engine 601 may filter the video signal 603 using a combination of the IIR filter having the selected IIR filter coefficients and the polyphase filter having the selected polyphase filter coefficients. The polyphase filter coefficients may implement a finite impulse response (FIR) filter for filtering the video signal 603. The scaling engine 601 may phase-shift the video signal. The processed video may be buffered.

The scaling engine 601 may be adapted to upscale or downscale the video signal 603 during scaling and may convert the video signal from a first format to a second format by combined IIR-filtering and polyphase filtering the video signal 603 utilizing the IIR and polyphase filter coefficients. The scaling engine 601 may determine a scaling factor for scaling the video signal 603 and may also determine an extent of the low pass filtering utilizing the scaling factor and/or a phase value of the video signal 603 utilizing the scaling factor. The scaling engine 601 may low pass filter the video signal 603 according to the generated IIR and polyphase filter coefficients.

While aspects of the invention relate to vertical direction video signal scaling in video applications, the invention is not limited in this way. More specifically, aspects of the invention may also be utilized in other systems utilizing large scale-factor scaling. Additionally, the invention may also be utilized in other types of signal scaling, such as horizontal scaling.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing a video signal, the method comprising:
   selecting infinite impulse response (IIR) filter coefficients for implementing an IIR filter for filtering a video signal during scaling;
   selecting polyphase filter coefficients for implementing a polyphase filter for filtering the video signal during the scaling; and
   filtering the video signal during the scaling, using a combination of the IIR filter having the selected IIR filter coefficients and the polyphase filter having the selected polyphase filter coefficients.

2. The method according to claim 1, wherein the polyphase filter coefficients implement a finite impulse response (FIR) filter for filtering the video signal.

3. The method according to claim 1, comprising determining a phase for the video signal prior to filtering the video signal.

4. The method according to claim 1, comprising phase-shifting the video signal.

5. The method according to claim 1, wherein the scaling of the video signal comprises upscaling or downscaling the video signal.

6. The method according to claim 1, comprising converting the video signal from a first format to a second format by combined IIR-filtering and polyphase filtering the video signal utilizing the IIR and polyphase filter coefficients.

7. The method according to claim 1, comprising determining a scaling factor for scaling the video signal.

8. The method according to claim 7, comprising determining an extent of low pass filtering utilizing the scaling factor.

9. The method according to claim 7, comprising determining a phase value of the video signal utilizing the scaling factor.

10. The method according to claim 1, comprising low pass filtering the video signal according to the generated IIR and polyphase filter coefficients.

11. A non-transitory computer readable storage medium having stored thereon, a computer program having at least one code section for processing a video signal, the at least one code section being executable by a machine for causing the machine to perform steps comprising:
    selecting infinite impulse response (IIR) filter coefficients for implementing an IIR filter for filtering a video signal during scaling;
    selecting polyphase filter coefficients for implementing a polyphase filter for filtering the video signal during the scaling; and
    filtering the video signal during the scaling, using a combination of the IIR filter having the selected IIR filter coefficients and the polyphase filter having the selected polyphase filter coefficients.

12. The computer-readable storage medium according to claim 11, wherein the polyphase filter coefficients implement a finite impulse response (FIR) filter for filtering the video signal.

13. The computer-readable storage medium according to claim 11, comprising code for determining a phase for the video signal prior to filtering the video signal.

14. The computer-readable storage medium according to claim 11, comprising code for phase-shifting the video signal.

15. The computer-readable storage medium according to claim 11, wherein the scaling of the video signal comprises code for upscaling or downscaling the video signal.

16. The computer-readable storage medium according to claim 11, comprising code for converting the video signal from a first format to a second format by combined IIR-filtering and polyphase filtering the video signal utilizing the IIR and polyphase filter coefficients.

17. The computer-readable storage medium according to claim 11, comprising code for determining a scaling factor for scaling the video signal.

18. The computer-readable storage medium according to claim 17, comprising code for determining an extent of low pass filtering utilizing the scaling factor.

19. The computer-readable storage medium according to claim 17, comprising code for determining a phase value of the video signal utilizing the scaling factor.

20. The computer-readable storage medium according to claim 11, comprising code for low pass filtering the video signal according to the generated IIR and polyphase filter coefficients.

21. A system for processing a video signal, the system comprising:
    one or more circuits operable to select infinite impulse response (IIR) filter coefficients for implementing an IIR filter for filtering a video signal during scaling;
    said one or more circuits operable to select polyphase filter coefficients for implementing a polyphase filter for filtering the video signal during the scaling; and
    said one or more circuits operable to filter the video signal during the scaling, using a combination of the IIR filter having the selected IIR filter coefficients and the polyphase filter having the selected polyphase filter coefficients.

22. The system according to claim 21, wherein the polyphase filter coefficients implement a finite impulse response (FIR) filter for filtering the video signal.

23. The system according to claim 1, wherein said one or more circuits are operable to determine a phase for the video signal prior to filtering the video signal.

24. The system according to claim 21, wherein said one or more circuits are operable to phase-shift the video signal.

25. The system according to claim 21, wherein during scaling of the video signal, said one or more circuits are operable to upscale or downscale the video signal.

26. The system according to claim 21, wherein said one or more circuits are operable to convert the video signal from a first format to a second format by combined IIR-filtering and polyphase filtering the video signal utilizing the IIR and polyphase filter coefficients.

27. The system according to claim 21, wherein said one or more circuits are operable to determine a scaling factor for scaling the video signal.

28. The system according to claim 27, wherein said one or more circuits are operable to determine an extent of low pass filtering utilizing the scaling factor.

29. The system according to claim 27, wherein said one or more circuits are operable to determine a phase value of the video signal utilizing the scaling factor.

30. The system according to claim 21, wherein said one or more circuits are operable to low pass filter the video signal according to the generated IIR and polyphase filter coefficients.

* * * * *